United States Patent [19]

Nishimura et al.

[11] Patent Number: 4,891,421

[45] Date of Patent: Jan. 2, 1990

[54] PROCESSES FOR PRODUCING POLYCARBONATE POLYOLS

[75] Inventors: Katsuhide Nishimura, Sakai; Motoyasu Kunugiza, Suita; Hiroharu Shirota; Hideyuki Ishizu, both of Izumi, all of Japan

[73] Assignee: Dainippon Ink and Chemicals, Inc., Tokyo, Japan

[21] Appl. No.: 209,575

[22] Filed: Jun. 22, 1988

[30] Foreign Application Priority Data

Jun. 22, 1987 [JP] Japan ................................ 62-155040
Jun. 24, 1987 [JP] Japan ................................ 62-155370
Jun. 25, 1987 [JP] Japan ................................ 62-156605

[51] Int. Cl.$^4$ ............................................ C08G 63/62
[52] U.S. Cl. ................................... 528/370; 528/368; 528/481; 528/85; 528/499; 528/500; 528/501
[58] Field of Search .............. 528/370, 481, 499, 500, 528/368, 501; 558/265, 266, 270; 260/708

[56] References Cited

U.S. PATENT DOCUMENTS 4,131,731 12/1978 Lai et al. ............................ 528/370

FOREIGN PATENT DOCUMENTS 946539 4/1974 Canada.
1064957 10/1979 Canada.

Primary Examiner—Theodore E. Pertilla
Attorney, Agent, or Firm—Sherman and Shalloway

[57] ABSTRACT

A process for producing a polycarbonate polyol by ester-interchange reaction of a dialkyl, diaryl or alkylene carbonate and a polyhydroxy compound, wherein the dialkyl, diaryl or alkylene carbonate is purified by adsorption treatment with an adsorbent prior to use in the reaction. A process for producing a polycarbonate polyol which comprises ester-interchange reaction of a dialkyl or diaryl carbonate and a polyhydroxy compound in the presence of a catalyst, wherein the proportion of the polyhydroxy compound to the dialkyl or diaryl carbonate is 1.01 to 1.30 times its stoichiometrical amount, and the amount of the catalyst is 0.0001 to 0.5% by weight, calculated as metal, based on the dialkyl or diaryl carbonate. Also provided is a process for producing a polycarbonate polyol by ester-interchange reaction of a dialkyl, diaryl or alkylene carbonate and a polyhydroxy compound in the presence of a catalyst in an amount, as metal, of 0.0001 to 0.5% by weight based on the dialkyl, diaryl or alkylene carbonate, which comprises a first step of reacting the dialkyl, diaryl or alkylene carbonate with the polyhydroxy compound, a second step of treating the resulting product with water at 60 to 300° C. to inactivate the catalyst, and a third step of removing water.

17 Claims, No Drawings

PROCESSES FOR PRODUCING POLYCARBONATE POLYOLS

This invention relates to processes for producing hydroxyl-terminate polycarbonate polyols suitable for economical production of highly pure polyurethanes having excellent thermal stability and hydrolysis resistance.

It has been known that polycarbonate polyols can be produced by the reaction of a dialkyl carbonate with a polyhydroxy compound (Canadian Patent No. 1064957), the reaction of a diaryl carbonate with a polyhydroxy compound (Canadian Patent No. 946539), and the reaction of an alkylene carbonate with a polyhydroxyl compound (U.S. Pat. No. 4,131,731).

Carbonate compounds used in the production of polycarbonate polyols are, for example, dimethyl carbonate, diethyl carbonate, di-n-butyl carbonate, ethylene carbonate, 1,2-propylene carbonate and diphenyl carbonate. Since these carbonate compounds are usually produced by reaction of alcohols or phenols with phosgene, they contain halogen compounds formed as by-products by the phosgenation reaction, especially alkyl or aryl chloroformates. Use of these carbonate compounds as raw materials for the polycarbonate polyols precludes production of highly pure polycarbonate polyols (and therefore, highly pure polyurethanes) because the resulting polycarbonate polyols are colored (and therefore polyurethanes produced from them are also colored), or undesirable side-reaction occur.

In the production of polycarbonate polyols, the proportion of the polyhydroxy compound with respect to the dialkyl or diaryl carbonate is equal to, or close to, its stoichiometrical amount. Accordingly, some of the terminal groups of the resulting polycarbonate polyol are the alkyl or aryl groups of the starting materials. When the starting polyhydroxy compound is a diol, the number of terminal hydroxyl groups of the resulting polycarbonate polyol becomes less than 2. Polyurethane produced by using such a polycarbonate polyol does not have a sufficiently high molecular weight.

It has already been known to use a titanium-containing catalyst in the ester-interchange reaction of the dialkyl or diaryl carbonate with the polyhydroxy compound. But since the amount of the titanium-containing catalyst is very small, the ester-interchange reaction is very slow. Furthermore, the yield of the polycarbonate polyol is extremely low, and the polycarbonate polyol is difficult to produce economically. On the other hand, if the titanium-containing ester-interchange catalyst is used in a large amount, the amount of the catalyst remaining in the resulting polycarbonate diol is large. Hence, the reactivity of the polycarbonate diol with the isocyanate group increases, and when it is reacted with a highly reactive polyisocyanate compound such as diphenylmethane diisocyanate or naphthalene diisocyanate, the reaction becomes difficult to control, or gellation occurs during the reaction.

Use of an alkali metal or an alkaline earth metal or its metal compound as the ester-interchange catalyst in these processes would be able to reduce the effect of halogen. However, since these catalysts result in slow rates of reaction and moroever, promote decomposition such as decarboxylation and induce abnormal reactions with isocynates during polyurethane production, after-treatments such as washing and neutralization are required.

These troubles may be obviated by separating the ester-interchange catalyst by adsorption on an adsorbent, or by adding an organic or inorganic acid or using a large amount of a diluent thereby reducing the reactivity. These steps are complex and not economical.

It is an object of this invention to solve these problems of the prior art and to provide a process for producing highly pure polycarbonate polyols economically and rapidly.

The object of the invention is achieved in accordance with this invention by (1) a process for producing a polycarbonate which comprises polyol ester-interchange reaction of a dialkyl, diaryl or alkylene carbonate and a polyhydroxy compound, wherein the dialkyl, diaryl or alkylene carbonate is purified by adsorption treatment with an adsorbent prior to use in the reaction;

(2) a process for producing a polycarbonate polyol which comprises ester-interchange reaction of a dialkyl or diaryl carbonate and a polyhydroxy compound in the presence of a catalyst, wherein the proportion of the polyhydroxy compound to the dialkyl or diaryl carbonate is 1.01 to 1.30 times its stoichiometrical amount, and the amount of the catalyst is 0.0001 to 0.5 % by weight, calculated a metal, based on the dialkyl or diaryl carbonate; and (3) a process for producing a polycarbonate polyol by ester-interchange reaction of a dialkyl, diaryl or alkylene carbonate and a polyhydroxy compound in the presence of a catalyst in an amount, as metal, of 0.0001 to 0.5 % by weight based on the dialkyl, diaryl or alkylene carbonate, which comprises a first step of reacting the dialkyl, diaryl or alkylene carbonate with the polyhydroxy compound, a second step of treating the resulting product with water at 60° to 300° C. to inactivate the catalyst, and a third step of removing water.

The stoichiometrical amount of the polyhydroxy compound to the dialkyl, diaryl or alkylene carbonate has the following meaning when taking up an example of using a dialkyl carbonate as the carbonate compound and a diol as the polyhydroxy compound.

The reaction in this case can be shown by the following formula

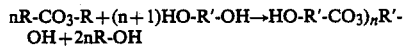

wherein R is an alkyl group, R' is a diol residue, and n is a number corresponding to the molecular weight of the desired polycarbonate diol.

The stoichiometrical amount of the polyhydroxy compound denotes a value calculated in accordance with the formula $n+1/n$.

The starting dialkyl, diaryl or alkylene carbonate may be produced from phosgene. Specific examples include dimethyl carbonate, diethyl carbonate, di-n-butyl carbonate, di-iso-butyl carbonate, diphenyl carbonate, ethylene carbonate, trimethylene carbonate, tetramethylene carbonate, 1,2-propylene carbonate, 1,2-butylene carbonate, 1,3-butylene carbonate, 2,3-butylene carbonate, 1,2-pentylene carbonate, 1,3-pentylene carbonate, 1,4-pentylene carbonate, 1,5-pentylene carbonate, 2,3-pentylene carbonate and 2,4-pentylene carbonate.

The adsorbent used in the process of this invention may be inorganic, and includes, for example, active terra alba, diatomaceous earth, acid terra alba, synthetic magnesium silicate, synthetic aluminum silicate, aluminum hydroxide, aluminum oxide, magnesium hydroxide, magnesium oxide, aluminum magnesium hydroxide, activated carbon, zeolites (zeolite, crystalline aluminosilicates), sodalite, A-type zeolite, faujasite, natrolite, mordenite, and heulandite. These adsorbents are not particularly restricted in their average particle diameter, and those having an average particle diameter of, for example, several microns to several tens of mm may be used widely. Preferably, the adsorbent used have an average particle pore diameter of 20 to 100 Å and a specific surface area of 10 to 500 $m^2/g$.

Because the adsorption in this invention is intended to permit adsorption of tiny amounts of halogen components in the starting carbonate compound, acidic adsorbents, such as acid terra alba, aluminum hydroxide, aluminum oxide, magnesium hydroxide, magnesium oxide and aluminum magnesium hydroxide are more effectively used. These adsorbents may be used singly or in combination. When the adsorbent is to be added to the starting carbonate compound, its amount is preferably 0.1 to 10% by weight based on the starting carbonate compound.

Examples of the hydroxy compound used in the processes of this invention include 1,3-propanediol, 1,4-butanediol, 1,5-pentanediol, 1,6-hexanediol, 1,7-heptanediol, 1,8-octanediol, 2-ethyl-1,6-hexanediol, 2-methyl-1,3-propanediol, neopentyl glycol, 1,3-cyclohexanediol, 1,4-cyclohexanediol, 2,2'-bis-(4-hydroxycyclohexyl)-propane, p-xylylenediol, p-tetrachloroxylenediol, 1,4-dimethylolcyclohexane, bis-hydroxymethyltetrahydrofuran, di(2-hydroxyethyl)dimethylhydantoin, diethylene glycol, triethylene glycol, polyethylene glycol, dipropylene glycol, polypropylene glycol, polytetramethylene glycol, thioglycol, trimethylolethane, trimethylolpropane, hexanetriol and pentaerythritol. These hydroxy compounds may be used singly or in combination.

In the present invention, ordinary catalysts for esterification or ester-interchange may be used to make the esterification proceed smoothly. Examples of the catalysts include inorganic acids and organic acids; chlorides, oxides and hydroxides of metals such as Li, Na, K, Rb, Ca, Mg, Sr, Zn, Al, Ti, V, Cr, Mn, Fe, Co, Ni, Cu, Zr, Pd, Sn, Sb and Pb; salts of the above-exemplified metals with fatty acids such as acetic acid, oxalic acid, octylic acid, lauric acid and naphthenic acid; alcoholates such as sodium methylate, sodium ethylate, aluminum triisopropoxide, isopropyl titanate, n-butyl titanate and octyl titanate; phenolates such as sodium phenolate; and organic metal compounds of metals such as Al, Ti, Zn, Sn, Zr and Pb. The amount of the catalyst used is usually 0.000001 to 5 % by weight, preferably 0.00001 to 0.5 % by weight, based on the weight of the starting substances.

Titanium-containing catalysts are especially preferred catalysts for use in this invention. Examples include organic titanium compounds and inorganic titanium compounds such as titanium halides and titanic acid. Specific examples are tetraethyl titanate, tetra-isopropyl titanate, tetra-n-butyl titanate, acetylacetone titanium, ammonium titanyl oxalate, titanium trichloride, titanium tetrachloride, titanium tetrafluoride, sodium chlorotitanate, ammonium chlorotitanate, ammonium fluorotitanate, titanic acid (IV), and titanium sulfate. Titanium tetrachloride, tetra-n-butyl titanate and tetra-iso-propyl titanate are especially preferred.

The proportion of the polyhydroxy compound to he starting carbonate compound should be 1.01 to 1.30 times, preferably 1.05 to 1.25 times, its stoichiometrical amount. If it is less than 1.01 times the stoichiometrical amount, some of the terminal groups of the resulting polycarbonate polyol are alkyl or aryl groups. Polyurethanes produced by using such a polycarbonate polyol do to have a sufficiently high molecular weight. If it is larger than 1.30 times the stoichiometrical amount, a large excess of the polyhydroxy compound should be used to obtain a polycarbonate polyol of the desired molecular weight, and a step of removing the polyhydroxy compound is essential after the ester-interchange reaction. This might result in reduced yields of the polycarbonate polyol. This is not economically advantageous. In order to produce a polycarbonate polyol whose terminal groups are substantially hydroxyl groups, the sufficient proportion of the polyhydroxy compound to the starting carbonate compound is 1.30 times its stoichiometrical amount.

The amount of the titanium-containing catalyst which may be used in the invention should be 0.0001 to 0.5 % by weight, preferably 0.0005 to 0.05 % by weight, as titanium, based on the starting carbonate compound. If the amount of the titanium-containing catalyst is less than 0.0001% by weight, the ester-interchange reaction between the starting carbonate compound and the polyhydroxy compound is very slow. This brings about the defect that the polycarbonate polyol is colored or its yield is reduced. On the other hand, if the amount of the titanium-containing catalyst is larger than 0.5% by weight as titanium, the polycarbonate polyol is markedly colored, and a polyurethane resin produced from it undergoes coloration.

The specific method of purifying the starting carbonate compound with the adsorbent is not particularly limited. For example, the adsorbent is added to the starting carbonate compound, and after adsorption for a certain period of time, the mixture is filtered; the starting carbonate compound is passed through a precoated adsorbent in a filter; or the adsorbent is filled in a cylindrical casing, and the starting carbonate compound is passed through the adsorbent while as required, pressure is applied to the adsorbent layer from top or bottom.

The reaction conditions for the reaction between the dialkyl, diaryl or alkylene carbonate with the polyhydroxy compound, i.e. the first step reaction, are not particularly limited. Usually, they are subjected to ester-interchange reaction at a temperature of as low as 180° C. or below for about 1 to 4 hours; the reaction mixture is further reacted at about 150° to 280° C., preferably about 180° to 240° C., for several hours; and the reaction is continued at this temperature for several hours under such a pressure as will finally reach 20 mmHg or below.

One characteristic feature is that the reaction product obtained in the first step is subjected to the second step of inactivating the catalyst by treating the product with preferably at least 0.01% by weight of water at a temperature of 60° to 300° C., preferably 90° to 250° C., and the third step of removing water, thereby forming a polycarbonate polyol.

In the second step of inactivating the catalyst, the tiny amount of the catalyst (e.g., an organotitanium compound) in the reaction product of the first step (composed mainly of a polycarbonate polyol) is reacted with water to convert it into an inert metal oxide (e.g., titanium oxide) to obtain the polycarbonate polyol having no catalytic activity.

Since the catalyst in the reaction product can be inactivated by this procedure, there can be obtained a highly pure polycarbonate polyol which permits easy control of the reaction of urethane.

Water used in the second step is preferably clean water such as pure water, distilled water, deionized water or tap water.

The amount of water used in the second step is preferably at least 0 01% by weight, especially preferably 0.1 to 5% by weight, based on the reaction product obtained in the first step. If it is less than the specified limit, it is difficult to lower the reactivity of the resulting polycarbonate polyol with the isocyanate group. On the other hand, the use of a large amount of water causes no trouble in lowering the reactivity of the polycarbonate polyol with the isocyanate group, but the second step of removing water requires a higher cost. The treatment of the product of the first step with water is carried out at a temperature of 60° to 300° C., preferably 90° to 250° C. If the temperature is lower than 60° C., it is difficult to reduce the reactivity of the produced polycarbonate polyol with the isocyanate group. Temperatures above 300° C. are not economical, and will color and decompose the polycarbonate polyol. In the second step, steam may be used as the water for treating the product of the first step at a temperature of about 100° C. or higher. The treatment at temperatures above 100° C. may be carried out under pressure. The time required for reacting the product of the first step with water is not particularly limited, but usually 30 minutes to 5 hours.

After the second step, the product is subjected to the third step of removing water, thereby producing a polycarbonate polyol. The method of removing water is not particularly limited. Usually, it is carried out under a reduced pressure, preferably under 80 mmHg or lower, at an elevated temperature, preferably 120° C. or higher. When the second step is carried out at high temperatures above 100° C., the third step may be omitted. Usually, it is desirable to carry out the third step to control the water content of the polycarbonate polyol.

The hydroxyl value of the product of the first step may sometimes increase in the second step and/or the third step. In such a case, the polycarbonate polyol may be subjected to a glycol elimination step after the third step so as to adjust its hydroxyl value.

The high purity polycarbonate polyol having no coloration produced by the present invention has a number average molecular weight of not more than 10,000 and readily reacts with a highly reactive diisocyanate to give a polyurethane resin having very good thermal stability and hydrolysis resistance.

The following examples illustrate the present invention without any intention of limiting it. All parts and percentages in the examples are by weight.

EXAMPLE 1

Diethyl carbonate (1,000 parts) produced by the reaction of ethanol with phosgene and 10 parts of magnesium aluminum hydroxide ($2.5MgO.Al_2O_3.xH_2O$) were charged into a glass reactor equipped with a stirrer and a thermometer, stirred at 100° C. for 1 hour, and filtered through filter paper (10 microns)

Then, 750 parts of the diethyl carbonate, 1,000 parts of 1,6-hexanediol and 0.055 part of tetra-iso-propyl titanate were charged into a glass reactor equipped with a stirrer, a thermometer and a distillation column, heated, and maintained at 125° C. for 1 hour while distilling off ethanol formed by the ester-interchange reaction. The reaction mixture was gradually heated to 180° C., maintained at this temperature for 2 hours, then heated to 200° C., and maintained at this temperature for 2 hours. While the reaction mixture was maintained at 200° C., the degree of vacuum of the reaction system was gradually elevated, and the reaction as performed finally for 2 hours under a pressure of 10 mmHg. The reaction mixture was heated to 220° C. to distill off part of 1,6-hexanediol and give a polycarbonate polyol having a molecular weight of about 2,000. This polyol had a hydroxyl value of 54.2 and a molten color (APHA) at 75° C. of 60.

EXAMPLE 2

Diethyl carbonate (1,000 parts) produced by the reaction of ethylene glycol with phosgene and 10 parts of synthetic aluminum silicate were charged into a glass reactor equipped with a stirrer and a thermometer, stirred at 100° C. for 1 hour, and filtered through filter paper (10 microns).

Then, 704 parts of the diethyl carbonate, 944 parts of 1,6-hexanediol and 0.055 part of tetra-iso-propyl titanate were charged into a glass reactor equipped with a stirrer, a thermometer and a distillation column, heated, and maintained at 150° C. for 8 hours while distilling off ethylene glycol formed by the ester-interchange reaction. The reaction mixture was gradually heated to 180° C., maintained at this temperature for 2 hours, then heated to 200° C., and maintained at this temperature for 2 hours. While the reaction mixture was maintained at 200° C., the degree of vacuum of the reaction system was gradually elevated, and the reaction was performed finally for 2 hours under a pressure of 10 mmHg. The reaction mixture was heated to 220° C. to distill off part of 1,6-hexanediol and give a polycarbonate polyol having a molecular weight of about 2,000. This polyol had a hydroxyl value of 55.9 and a molten color (APHA) at 75° C. of 110.

EXAMPLE 3

Diphenyl carbonate (1,000 parts) produced by the reaction of phenol with phosgene and 10 parts of activated terra alba were charged into a glass reactor equipped with a stirrer and a thermometer, stirred at 100° C. for 1 hour, and filtered through filter paper (10 microns).

Then, 944 parts of the diphenyl carbonate, 635 parts of 1,6-hexanediol and 0.055 part of tetra-iso-propyl titanate were charged into a glass reactor equipped with a stirrer, a thermometer and a distillation column, heated to 210° C. while distilling off phenol formed by the ester-interchange reaction. The reaction mixture was then maintained at this temperature for 10 hours while passing a small amount of nitrogen to aid in the distillation of phenol. The reaction mixture was heated to 220° C., and maintained at this temperature for 2 hours. While the reaction mixture was maintained at this temperature, the degree of vacuum of the reaction system was gradually elevated, and the reaction was performed finally under a pressure of 10 mmHg to distill off part of 1,6-hexanediol and give a polycarbonate polyol having a molecular weight of 1,000. This polyol had a hydroxyl value of 115.0 and a molten color (APHA) at 75° C. of 100.

COMPARATIVE EXAMPLE 1

Diethyl carbonate (771 parts) produced by the reaction of ethanol with phosgene and not purified with an adsorbent, 950 parts of 1,6-hexanediol and 0.071 part of tetra-iso-propyl titanate were charged into a glass reactor equipped with a stirrer, a thermometer and a distillation column, heated, and maintained at 125° C. for 1 hour while distilling off ethanol formed by the ester-interchange reaction. The reaction mixture was gradually heated to 180° C., maintained at this temperature for 2 hours, and further heated to 200° C. and maintained at this temperature for 2 hours. Then, while the reaction mixture was maintained at 200° C., the degree of vacuum in the reaction system was gradually elevated, and the reaction was performed finally for 2 hours under a pressure of 10 mmHg. The reaction mixture was heated to 220° C. to distill off part of 1,6-hexanediol and give a polycarbonate polyol having a molecular weight of about 2,000. The polyol had a hydroxyl value of 54.2 and a molten color (APHA) at 75° C. of 400.

COMPARATIVE EXAMPLE 2

Diethyl carbonate (771 parts) produced by the reaction of ethanol with phosgene. 1.8 parts of propylene oxide, 950 parts of 1,6-hexanediol and 0.071 part of tetra-iso-propyl titanate were charged into a glass reactor equipped with a stirrer, a thermometer and a distillation column, heated, and maintained at 125° C. for 1 hour while distilling off ethanol formed by the ester-interchange reaction. The reaction mixture was gradually heated to 180° C., maintained at this temperature for 2 hours, and further heated to 200° C. and maintained at this temperature for 2 hours. Then, while the reaction mixture was maintained at 200° C., the degree of vacuum in the reaction system was gradually elevated, and the reaction was performed finally for 2 hours under a pressure of 10 mmHg. The reaction mixture was heated to 220° C. to distill off part of 1,6-hexanediol and give a polycarbonate polyol having a molecular weight of about 1,000. The polyol had a hydroxyl value of 110.2 and a molten color (APHA) at 75° C. of 200.

COMPARATIVE EXAMPLE 3

Diethyl carbonate produced by the reaction of ethanol with phosgene was purified by distillation at a boiling point of 126° to 127° C. under atmospheric pressure in a glass reactor equipped with a packed column. The above diethyl carbonate (694 parts), 892 parts of 1,6-hexanediol and 0.064 part of tetra-iso-propyl titanate were charged into a glass reactor equipped with a stirrer, a thermometer and a distillation column, heated, and maintained at 125° C. for 1 hour while distilling off ethanol formed by the ester-interchange reaction. The reaction mixture was gradually heated to 180° C., maintained at this temperature for 2 hours, and heated to 200° C., and maintained at this temperature for 2 hours. While the reaction mixture was maintained at 200° C., the degree of vacuum in the reaction system was gradually elevated, and the reaction was carried out finally for 2 hours under a pressure of 10 mmHg. The reaction mixture was heated to 220° C. to distill off part of 1,6-hexanediol and give a polycarbonate polyol having a molecular weight of about 2,000. This polyol had a hydroxyl value of 55.1 and a molten color (APHA) at 75° C. of 350.

Each of the polycarbonate polyols obtained in Examples 1 to 3 and Comparative Examples 1 to 3 was taken in an amount of 300 g into a 500 ml glass bottle. The glass bottle was capped while permitting slight ventilation. The bottle was left to stand in an oven at 200° C. for 5 days, and the changes in color were compared. The results are shown in Table 1.

TABLE 1

| | Starting material (*1) | | | Product | | Thermal stability, |
|---|---|---|---|---|---|---|
| Sample (*3) | Adsorbent | Carbonate compound | Poly-hydroxy compound | Hydroxyl value | Molten color (APHA) at 75° C. (*2) | molten color (APHA) when maintained at 200° C. for 5 days (*2) |
| Ex. 2 | Magnesium alumimum hydroxide | DEC | HG | 54.2 | 80 | 120 |
| Ex. 2 | Synthetic aluminum silicate | EC | HG | 55.9 | 110 | 200 |
| Ex. 3 | Active terra alba | DPC | CHDM | 115.0 | 100 | 140 |
| CEx. 1 | — | DEC | HG | 54.2 | 400 | Black brown |
| CEx. 2 | (0.1% of propylene oxide was added) | DEC | HG | 110.2 | 200 | 350 |
| CEx. 3 | — | DEC | HG | 55.1 | 350 | Black brown |

(*1): DEC = diethyl carbonate, EC = ethylene carbonate, DPC = diphenyl carbonate, HG = 1,6-hexanediol, CHDM = 1,4-cyclohexane dimethanol.
(*2): The molten colors were measured in accordance with JIS K-6901.
(*3): Ex. = Example, CEx. = Comparative Example

EXAMPLE 4

Diethyl carbonate (771 parts) produced by the reaction of ethanol with phosgene, 991 parts of 1,6-hexanediol and 0.091 part of tetra-iso-propyl titanate were charged into a glass reactor equipped with a stirrer, a thermometer and a distillation column, heated, and maintained at 125° C. for 1 hour while distilling off ethanol formed by the ester-interchange reaction. The reaction mixture was gradually heated to 180° C., maintained at this temperature for 2 hours, and further heated to 200° C. and maintained at this temperature for 2 hours. While maintaining the reaction mixture at 200° C., the degree of vacuum in the reaction system was gradually elevated, and the reaction was carried out finally for 2 hours under a pressure of 10 mmHg. The reaction mixture was heated to 220° C. to distill off part of the 1,6-hexanediol and give a polycarbonate polyol having a molecular weight of about 2,000. This polyol had a hydroxyl value of 54.2 and a molten color (Gardner) at 75° C. of 3. The results are shown in Table 2.

COMPARATIVE EXAMPLE 4

Diethyl carbonate (723 parts) produced by the reaction of ethanol with phosgene, 841 parts of 1,6-hexanediol and 0.013 part of tetra-iso-propyl titanate were charged into a glass reactor equipped with a stirrer, a thermometer and a distillation column, heated, and maintained at 125° C. for 1 hour while distilling off ethanol formed by the ester-interchange reaction. The reaction mixture was gradually heated to 180° C., maintained at this temperature for 2 hours, and further heated to 200° C. and maintained at this temperature for 2 hours. While maintaining the reaction mixture at 200° C., the degree of vacuum in the reaction system was gradually elevated, and the reaction was carried out finally for 2 hours under a pressure of 10 mmHg. The reaction mixture was heated to 20° C. to distill off part of the 1,6-hexanediol and give a polycarbonate polyol having a molecular weight of about 1,000. This polyol had a hydroxyl value of 114.5 and a molten color (Gardner) at 75° C. of 6. The results are shown in Table 2.

COMPARATIVE EXAMPLE 5

Diethyl carbonate (771 parts) produced by the reaction of ethanol with phosgene, 908 parts of 1,6-hexanediol and 18.3 parts of titanium tetrachloride were charged into a glass reactor equipped with a stirrer, a thermometer and a distillation column, heated, and maintained at 25° C. for 1 hour while distilling off ethanol formed by the ester-interchange reaction. The reaction mixture was gradually heated to 180° C., maintained at this temperature for 2 hours, and gradually heated to 200° C. and maintained at this temperature for 2 hours. While maintaining the reaction mixture at 200° C., the degree of vacuum in the reaction system was gradually elevated, and the reaction was carried out finally for 3 hours under a pressure of 10 mmHg. The reaction mixture was heated to 220° C. to distill off part of the 1,6-hexanediol and give a polycarbonate polyol having a molecular weight of about 2,000. This polyol had a hydroxyl value of 52.2 and a molten color (Gardner) at 75° C. of 15. The results are shown in Table 2.

EXAMPLE 5

Diphenyl carbonate (1,049 parts) produced by the reaction of phenol with phosgene, 706 parts of 1,6-hexanediol and 0.31 part of tetra-n-propyl titanate were charged into a glass reactor equipped with a stirrer, a thermometer, a distillation column and a nitrogen introduction tube, heated, and heated to 210° C. while distilling off phenol formed by the ester-interchange reaction. To assist in the distillation of phenol, the reaction mixture was maintained at this temperature for 10 hours while passing a small amount of nitrogen. The reaction mixture was heated to 220° C. and maintained at this temperature for 2 hours. While the reaction mixture was maintained at this temperature, the degree of vacuum in the reaction system was gradually elevated, and the reaction was carried out finally under a pressure of 10 mmHg to distill off part of 1,6-hexanediol and give a polycarbonate polyol having a molecular weight of about 1,000. This polyol had a hydroxyl value of 111.2 and a molten color (Gardner) at 75° C. of 2. The results are shown in Table 2.

EXAMPLE 6

Diethyl carbonate (578 parts) produced by the reaction of ethanol with phosgene, 903 parts of 1,4-cyclohexane dimethanol and 1.23 parts of tetra-n-butyl titanate were charged into a glass reactor equipped with a stirrer, a thermometer and a distillation column, heated, and maintained at 12° C. for 1 hour while distilling off ethanol formed by the ester-interchange reaction. The reaction mixture was gradually heated to 180° C. and maintained at this temperature for 2 hours, and then heated to 200° C. and maintained at this temperature for 2 hours. While the reaction mixture was maintained at 200° C., the degree of vacuum in the reaction system was gradually elevated, and the reaction was carried out finally for 2 hours under a pressure of 10 mmHg. The reaction mixture was heated to 220° C. to distill off part of 1,4-cyclohexane dimethanol and give a polycarbonate polyol having a molecular weight of about 1,000. This polyol had a hydroxyl value of 121.0 and a molten color (Gardner) at 75° C. of 2. The results are shown in Table 2.

COMPARATIVE EXAMPLE 6

Diethyl carbonate (694 parts) produced by the reaction of ethanol with phosgene, 1,115 parts of 1,6-hexanediol, and 0.082 part of tetra-iso-propyl titanate were charged into a glass reactor equipped with a stirrer, a thermometer and a distillation column, heated, and maintained at 125° C. for 1 hour while distilling off ethanol formed by the ester-interchange reaction. The reaction mixture was gradually heated to 180° C. and maintained at this temperature for 2 hours, and then heated to 200° C. and maintained at this temperature for 2 hours. While the reaction mixture was maintained at 200° C., the degree of vacuum in the reaction system was gradually elevated, and the reaction was carried out finally for 3 hours under a pressure of 10 mmHg. The reaction mixture was heated to 220° C. to distill off part of 1,6-hexanediol and give a polycarbonate polyol having a molecular weight of about 2,000. This polyol had a hydroxyl value of 58.4 and a molten color (Gardner) at 75° C. of 3 to 4. The results are shown in Table 2.

TABLE 2

| Sample | Starting Materials (*1) | | | | Amount of the catalyst (ppm as Ti) | Yield (%) (*2) | Hydroxyl value | Molten color (Gardner at 75° C.) (*3) | Number of functional groups (*4) | Urethanization (*5) |
| --- | --- | --- | --- | --- | --- | --- | --- | --- | --- | --- |
| | Carbonate compound | Hydroxy compound | Stoichiometric ratio | Catalyst | | | | | | |
| Example 4 | DEC | HG | 1.20 | TIPT | 20 | 90 | 54.2 | 3 | 2.0 | Good |
| Comparative Example 4 | DEC | HG | 1.0 | TIPT | 3 | 42 | 114.5 | 6 | 1.6 | Molecular weight did not become high |
| Compartive Example 5 | DEC | HG | 1.0 | TiCl₄ | 6000 | 81 | 52.2 | 15 | 1.9 | Solidified to a gel |
| Example 5 | DPC | HG | 1.05 | TPT | 50 | 85 | 111.2 | 2 | 2.0 | Good |
| Example 6 | DEC | CHDM | 1.10 | TBT | 300 | 95 | 121.0 | 2 | 2.0 | Good |
| Comparative | DEC | HG | 1.50 | TIPT | 20 | 72 | 58.4 | 3–4 | 2.0 | Good |

TABLE 2-continued

| Sample | Starting Materials (*1) | | | | Amount of the catalyst (ppm as Ti) | Yield (%) (*2) | Hydroxyl value | Molten color (Gardner at 75° C.) (*3) | Number of functional groups (*4) | Urethanization (*5) |
| --- | --- | --- | --- | --- | --- | --- | --- | --- | --- | --- |
| | Carbonate compound | Hydroxy compound | Stoichiometric ratio | Catalyst | | | | | | |
| Example 6 | | | | | | | | | | |

(*1): DEC = diethyl carbonate, DPC = diphenyl carbonate, HG = 1,6-hexanediol, CHDM = 1,4-cyclohexane dimethanol, TIPT = tetra-iso-propyl titanate, TiCl$_4$ = titanium tetrachloride, TPT = tetrapropyl titanate, TBT = tetrabutyl titanate.
(*2): Yield = actual amount yielded/theoretical amount yielded
(*3): Measured in accordance with JIS K-6901.
(*4): The product was hydrolyzed. The allyl or alkyl carbonate whose terminals were blocked with hydroxyl groups, and the number of functional group was calculated.
(*5): The urethanization was carried out by reacting the polycarbonate polyol/1,4-butanediol/MDI (1/2/3 in mole ratio) in DMF solution (NV 50%) by a one-shot method.

COMPARATIVE EXAMPLE 7

Diethyl carbonate (3,855 parts) produced by the reaction of ethanol with phosgene, 4,955 parts of 1,6-hexanediol, and 2.65 parts of tetra-iso-propyl titanate were charged into a glass reactor equipped with a stirrer, a thermometer and a distillation column, heated, and maintained at 125° C. for 1 hour while distilling off ethanol formed by the ester-interchange reaction. The reaction mixture was gradually heated to 180° C. and maintained at this temperature for 2 hours, and then heated to 200° C. and maintained at this temperature for 8 hours. While the reaction mixture was maintained at 200° C., the degree of vacuum in the reaction system was gradually elevated, and the reaction was carried out finally for 2 hours under a pressure of 10 mmHg. The reaction mixture was heated to 220° C. to distill off part of 1,6-hexanediol and give a polycarbonate polyol having a molecular weight of about 2,000. This polyol had a hydroxyl value of 55.5.

EXAMPLE 7

Distilled water (15 parts) was added to 500 parts of the polyol obtained in Comparative Example 7, and the mixture was stirred at 90° C. for 5 hours. The mixture was heated to 150° C. and dehydrated at 150° C. and 40 mmHg for 1 hour. The resulting polyol had a hydroxyl value of 56.4.

EXAMPLE 8

Five hundred parts of the polyol obtained in Comparative Example 7 was heated to 200° C., and stirred for 2 hours while blowing steam into it from below the liquid surface. Thereafter, the pressure was reduced to 10 mmHg while maintaining the reaction mixture at 200° C. to dehydrate the reaction mixture and distill off part of 1,6-hexanediol. The resulting polyol had a hydroxyl value of 56.4.

COMPARATIVE EXAMPLE 8

Distilled water (25 parts) was added to 500 parts of the polyol obtained in Comparative Example 7, and the mixture was stirred at 55° C. for 4 hours. The reaction mixture was dehydrated at 100° C. and 3 mmHg for 1 hour. The resulting polyol had a hydroxyl value of 55.8.

REFERENTIAL EXAMPLE

Two hundred parts of each of the polycarbonate polyols obtained in Examples 7 and 8 and Comparative Examples 7 and 8 was dissolved in 300 parts of dimethylformamide. The solution was heated to 50° C., 3 moles of diphenylmethane diisocyanate per mole of polycarbonate polyol was added and reacted at 70° C. for 1 hour to prepare a urethane prepolymer. The urethane prepolymer was cooled to 50° C., and 2 moles, per mole of the polycarbonate polyol, of 1,4-butanediol was added and reacted at 60° C. for 12 hours. When the viscosity rose during this time, the synthesis of polyurethane was performed while lowering the viscosity by adding dimethylformamide, and the final solids content was adjusted to 30 % by weight. By observing the state of the polyurethane solution at this time, the degree of reactivity in urethanization was determined. The results are shown in Table 3.

TABLE 3

| | Amount of water added (%) | Temperature of reaction with water (°C.) | Reactivity in urethanization |
| --- | --- | --- | --- |
| Comparative Example 7 | 0 | — | Solidified to a gel |
| Example 7 | 3 | 90 | Good (*) |
| Example 8 | Blowing of steam | 200 | Good (*) |
| Comparative Example 8 | 5 | 55 | Solidified to a gel |

(*) "Good" denotes a solution of a polyurethane which had a viscosity of about 50,000 cps and was free from insoluble materials when its solids content was adjusted to 30% by weight.

We claim:
1. A process for producing a polycarbonate polyol which comprises ester-interchange reaction of a dialkyl, diaryl or alkylene carbonate and a polyhydroxy compound having terminal alcoholic hydroxy groups, wherein the dialkyl, diaryl or alkylene carbonate is purified by adsorption treatment with an inorganic adsorbent prior to use in the reaction.
2. The process of claim 1 in which the adsorbent has an average pore diameter of 20 to 100 Å and a specific surface area of 10 to 600 m$^2$/g.
3. A process for producing a polycarbonate polyol which comprises ester-interchange reaction of a dialkyl or diaryl carbonate and a polyhydroxy compound having terminal alcoholic hydroxy groups in the presence of a catalyst selected from the group consisting of inorganic acids, organic acids, metal chlorides, metal oxides, metal hydroxides, metal salts of fatty acids, metal alcoholates, metal phenolates and organic metal compounds, wherein the proportion of the polyhydroxy compound to the dialkyl or diaryl carbonate is 1.01 to 1.30 times its stoichiometrical amount, and the amount of the catalyst is 0.0001 to 0.5% by weight, calculated as metal, based on the dialkyl or diaryl carbonate.

4. The process of claim 3 in which the proportion of the polyhydroxy compound is 1.05 to 1.25 times its stoichiometrical amount.

5. The process of claim 3 in which the catalyst is a titanium compound.

6. The process of claim 3 in which the amount of the catalyst is 0.005 to 0.05 % by weight.

7. A process for producing a polycarbonate polyol by ester interchange reaction of a dialkyl, diaryl or alkylene carbonate and a polyhydroxy compound having terminal alcoholic hydroxy groups in the presence of a catalyst selected from the group consisting of inorganic acids, organic acids, metal chlorides, metal oxides, metal hydroxides, metal salts of fatty acids, metal alcoholates, metal phenolates and organic metal compounds in an amount, as metal of 0.0001 to 0.5% by weight based on the dialkyl, diaryl or alkylene carbonate, which comprises a first step of reacting the dialkyl, diaryl or alkylene carbonate with the polyhydroxy compound, a second step of treating the resulting product with water at 60° to 300° C. to inactivate the catalyst, and a third step of removing water.

8. The process of claim 7 in which the catalyst is a titanium compound.

9. The process of claim 7 in which the dialkyl, diaryl or alkylene carbonate is subjected to adsorption treatment with an inorganic adsorbent prior to use.

10. The process of claim 7 in which the amount of the catalyst is 0.0005 to 0.05 % by weight.

11. The process of claim 9 wherein the adsorbent is added to the starting carbonate compound followed by filtering of the mixture.

12. The process of claim 9 wherein the adsorbent is pre-coated on a filter and the starting carbonate compound is passed therethrough.

13. The process of claim 9 wherein the adsorbent is fitted in a cylindrical casing and the starting carbonate is passed therethrough with pressure applied to the adsorbent layer from top or bottom.

14. The process of claim 7 wherein the ester-interchange reaction is conducted at a temperature of 150° to 280° C. under pressure up to 20 mmHg.

15. The process of claim 7 wherein the amount of water used in the second step is at least 0.01% by weight based on the reaction product obtained in the first step.

16. The process of anyone of claims 1, 3 or 7 wherein the carbonate compound is selected from the group consisting of dimethyl carbonate, diethyl carbonate, di-n-butyl carbonate, di-iso-butyl carbonate, diphenyl carbonate, ethylene carbonate, trimethylene carbonate, tetramethylene carbonate, 1,2-propylene carbonate, 1,2-butylene carbonate, 1,3-butylene carbonate, 2,3-butylene carbonate, 1,2-pentylene carbonate, 1,3-pentylene carbonate, 1,4-pentylene carbonate, 2,3-pentylene carbonate and 2,4-pentylene carbonate.

17. The process of anyone of claims 1, 3 or 7 wherein the polyhydroxy compound is at least one compound selected from the group consisting of 1,3-propanediol, 1,4-butanediol, 1,5-pentanediol, 1,6-hexanediol, 1,7-heptanediol, 1,8-octanediol, 2-ethyl-1,6 hexanediol, 2-methyl-1,3-propanediol, neopentyl glycol, 1,3-cyclo-hexanediol, 1,4-cyclohexandiol, 2,2'-bis-(4-hydroxycyclohexyl)-propane, p-xylyenediol, p-tetrachloroxylene-diol, 1,4dimethylolcyclohexane, bis-hydromethyl-tetra-hydrofuran, di(2-hydroxyethyl)dimethylhydantoin, di-ethylene glycol, triethylene glycol, polyethylene glycol, dipropylene glycol, polypropylene glycol, polytetra-methylene glycol, thioglycol, trimethylolethane, trimethylolpropane, hexanetriol and pentaerythritol.

* * * * *

UNITED STATES PATENT AND TRADEMARK OFFICE
CERTIFICATE OF CORRECTION

PATENT NO. : 4,891,421

DATED : January 2, 1990

INVENTOR(S) : KATSUHIDE NISHIMURA ET AL.

It is certified that error appears in the above-identified patent and that said Letters Patent is hereby corrected as shown below:

Column 14

Claim 13, line 2 of the claim, "fitted" should read --filled--.

Claim 17, line 7 of the claim, "cyclohexandiol" should read --cyclohexanediol--;

line 8 of the claim, "xylyenediol" should read --xylylenediol--;

line 9 of the claim, "1,4dimethylolcyclohexane" should read --1,4-dimethylolcyclohexane--; and lines 9 and 10 of the claim, "bis-hydromethyltetra-hydrofuran" should read --bis-hydroxymethyltetra-hydrofuran--.

Signed and Sealed this

Nineteenth Day of February, 1991

Attest:

HARRY F. MANBECK, JR.

Attesting Officer

Commissioner of Patents and Trademarks